United States Patent Office 3,679,445
Patented July 25, 1972

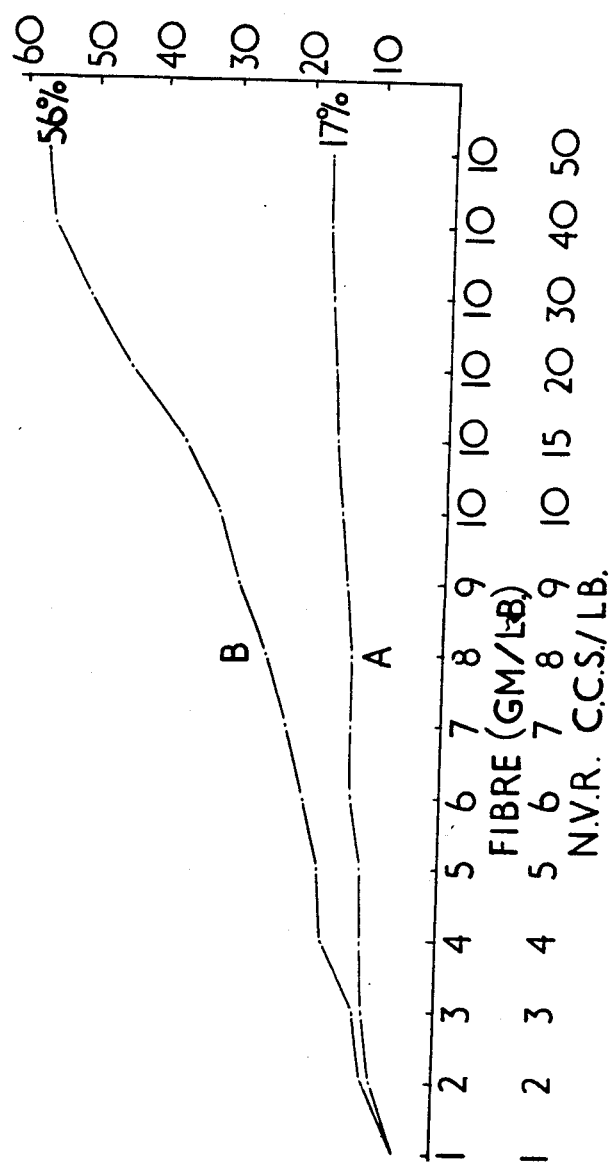

3,679,445
LOW DENSITY CONCRETES AND
THEIR MANUFACTURE
Alan Colin Scott Howe, Hemel Hempstead, England, assignor to John Laing and Son Limited, London, England
No Drawing. Filed Aug. 25, 1969, Ser. No. 852,920
Claims priority, application Great Britain, Aug. 23, 1969, 40,418/68
Int. Cl. C04b 31/02
U.S. Cl. 106—88          26 Claims

ABSTRACT OF THE DISCLOSURE

A plastic concrete or mortar mix including an incorporated gas such as entrained air, and from one to ten grams of short fibres per pound of cement uniformly distributed throughout the mix.

---

This invention relates to low density concretes and their manufacture, and has a specially advantageous application to highly air-entrained concretes. "Air-entrained" concretes are normally regarded as having an air or other gaseous content up to about 10% occluded air or gas by volume of the finished product, and are made with the aid of an air entrainment additive in the mixing water. For convenience whatever the entrained gas may be the material produced will be referred to in this specification as "air-entrained" which is a known term in the art. Similarly, "air -entraining agent" should be taken to mean any gas-incorporating agent, whether it produces a generated gas, entrains the ambient air, or acts in other fashion. The present invention is generally concerned with higher values of air entrainment in the range exceeding 10% air entrainment as measured by the gravimetric method in which the difference between the densities of a non-air-entrained control sample and a sample of the highly air-entrained concrete is expressed as a percentage.

After plastic formulations of concrete or mortar have been placed in their final position, their progress to the hard condition is accomplished in two stages. In the first, the mass loses plasticity, then become crystalline and friable. In the second, consolidation takes place, and the mass increases in hardness until a stony texture is finally obtained. These two stages are distinguished as the processes of "setting" and "hardening." They are separate and distinguishable to the extent that either or both processes can be accelerated or delayed by the use of specific chemical additives, mechanical devices and variations in temperature.

To prevent segregation occurring during or after final emplacement of concrete (still in the primary plastic stage), the amount, gradation and shape of aggregate must be evenly distributed and sufficiently balanced in relation to the proportion, density and consistency of the paste of cement and water in the mix. Hitherto, there has been no simple and effective means to prevent segregation with the consequential internal contraction and surface collapse causing dimensional instability and withdrawal from vertical contours within the confined spaces of concrete formwork and moulding devices in which highly air entrained concrete and mortar formulations with aggregate/cement ratios up to at least 7:1 by weight have been emplaced.

An important discovery has now been made according to the present invention, in finding that short fibre admixed into the wet mix (cement/water/air paste) at a dosage level from one gram per pound cement upwards has the ability to maintain uniform dispersion of solid, liquid and gaseous components within highly air entrained concrete and mortar mixes during the critical stage of setting when the process of changing from liquid to crystalline solid takes place.

In a broad aspect therefore the invention envisages a wet concrete or mortar mix including incorporated gas, such as entrained air, and from one to ten grams of short fibres per pound of cement uniformly distributed throughout the mix.

Usually the maximum aggregate size is up to 1½ inches, and the mix may include single-size materials or continuously graded material without detrimental effect.

While some value is achieved with mixes as lean as 10:1 (aggregate/cement ratio by weight) the invention is more generally useful in the conventional ranges up to, say, 7:1.

The aggregate may be a natural aggregate or synthetic aggregate, as specified at various points below. The synthetic materials may be those lightweight materials known under the trade names "Lytag" (a sintered pulverised fuel ash) and "Leca" (a bloated clay aggregate) and are defined in the British Standard Specification 3797:1964 and 3892:1965.

The air-entrained concrete will generally contain a suitable air-entraining agent, as known in the art. A typical example is the neutralized form of the resin obtained by wood distillation.

There are however three main types usable:

(a) Natural, such as keratin, animal and vegetable fats and fatty acids, natural wood resins, e.g. neutralized by the lime in the cement;
(b) Modified natural, such as alkali salts of wood resins, calcium salts of glue sodium abietate;
(c) Synthetic, such as detergents, especially the alkylsulphonates, sodium salts of cycloparaffin catoxylic acids, e.g. naphthenates, triethyanolamine salts of sulphated aromatic hydrocarbons, aryl polyglycols.

Preferably, the fibres are less than 2 inches long, and usually range in length between about ⅛ inch and 1⅛ inch. They may be of regular or natural shape, or they may include crimped, hammered or tapered profiles.

Although there is no specific limitation on the nature of the fibre used, considerations of toughness, ultimate strength, immunity to attack by any of the ingredients of the mix—at least until the mix is no longer plastic and so on will normally serve to put practical limitations on the choice of fibre for carrying out the invention. Typical fibres are itemised later.

Examination of results shows that the extent of air entrainment and even distribution of dimensional stability achieved is directly dependent upon the combined performance of each separate additive present. For instance, where fibre was deliberately left out of formulations and the extent of air entrainment raised to about 15% in concrete containing aggregates ¾-inch maximum size in A/C (aggregate/cement) ratios between 3:1 and 5:1 aggregate distribution became defective, dimensional stability impaired and replication unreliable.

The results of studies appear to indicate that the population of fibres, when evenly distributed within the highly air-entrained matrix, provides a load transfer system and stress absorption characteristic which maintain the static stability in addition to physical ability to assist in the increase and stabilisation of the air-entrainment capability.

The evident ability of fibre to increase the stability and amount of air entrainment in concrete and mortar formulations dosed with air-entraining agents can be related to the fact that the fibre must be associated with an involved in: (a) expansion of the specific surface of the cement/water paste; (b) reducing work required to expand the paste surface; (c) enclosing air and retaining it under the surface; and (d) countering disturbance and drainage which causes bubbles to collapse.

The combined action of the air entraining agent and fibre appears to produce one or more separate effects to an extent which varies with the concentrations of air-entraining agent and of fibre, the A/C and water/cement ratios, fibre dimensions, aggregate size and grading, mixing time and type of mixing action.

The combined performance of fibre and air-entraining agents in concrete and mortar formulations cannot be fully exploited unless their uniform distribution throughout the mix has been effected.

In another aspect the invention provides a method of producing a wet mix as described above, comprising: mixing aggregate, cement, water, and air-entraining agent to form a wet concrete mixture; adding to the wet mixture from 1 to 10 grams of short fibre per pound of cement used; and continuing the mixing until a desired degree of air-entrainment is achieved.

The method may be effected by first mixing the necessary quantities of dry aggregate/cement ingredients as a premix and then adding the required total amount of water and then the air-entraining agent. Thereafter, fibres are added in the proportion of between 1 gram and 10 grams per pound of cement, with continuing mixing for a period to produce the required consistency of the final mix.

The fibre may be mixed with the wet mixture in two stages:

(i) a first stage at a slower speed to incorporate added fibre into the mixture below its surface, and
(ii) a second stage at a higher speed to complete distribution of the fibre and air-entrain the mix.

Advantageously, mixing is started, at a relatively low speed, while the water is being added, and is continued at this speed after the addition of the fibres for about ½-minute.

Addition of an air-entraining agent can be effected either in the mixing water, or to the wet mixture. If the mixture is of a suitable water content the air entraining agent can be added as a stable foam.

In the study to determine which formulations were most effective the following approximate limitations were found preferable:

(a) Maximum aggregate/cement ratio—7:1 by weight
(b) Maximum aggregate size—1½ inch
(c) Minimum water/cement ratio—0.20
(d) Maximum length of fibre—1⅛ inch
(e) Minimum length of fibre—⅛ inch
(f) Minimum dosage of fibre per lb. cement—1 g.
(g) Maximum dosage of fibre per lb. cement—5 g.
(h) Maximum diameter of fibre—0.020 inch
(i) Mixer type having stirring-type action
(j) Maximum dose air-entraining agent per pound cement. Adequate to preserve normal setting and hardening times, i.e. for NVR—6 cc.

In the investigations reported below, the following materials and equipment were used:

"Portland cements" (OP or RHP) as described in B.S. 12:1958.

"High alumina cement" (HA) as described in B.S. 915:1947.

"White cement" (W) conforming with B.S. 12:1958.

"Super rapid hardening" (SRH) ultra-high early strength cement very finely ground.

"Aggregates from natural sources for concrete" as described in B.S. 882 and 1201:1965.

"Lightweight aggregates for concrete" as described in B.S. 3797:1964.

"Foamed or expanded blast furnace slag lightweight aggregates for concrete" as described in B.S. 877:1967.

"Pulverised fuel ash for use in concrete" as described in B.S. 3892:1965.

"Building sands from natural sources" as described in B.S. 1198 and 1200:1955.

Fibres, regular and deformed (hammered and crimped), in diameters between 0.001" and 0.020" and lengths between 0.125" and 1.125" from cotton, flax, rayon, Orlon, nylon, Dacron, terylene, polyethylene, polypropylene, P.V.C. and glass.

Air-entraining agent sold under the trade name N.V.R. (also know as Plastaid Air Entraining).

Mixers—Hobart mixer model SE.500 and "Liner Cumflow" Type O.

Consistent density results and regular distribution of fibre were obtained by the following batching and mixing sequence:

Coarse aggregate weighed and placed in mixer pan first.
Fine aggregate weighed and placed second.
Cement weighed and placed third.
Start mixer on speed No. 1.
Water (with dosage air entraining agent added) poured into mixer pan.
Fibre added to wetted mix.
Mix on speed No. 1 for one half minute to incorporate fibre.
Select speed No. 2 and mix for duration between one half and two minutes to achieve density required.

All proportions referred to in the mix data below have been stated in terms of "dry" weight with cement nominated as unity. The term "water added" means the amount of water added to the other mix proportions in the batch at mixing time. Water, as such, was weighed net in containers placed on a scale graduated to weigh accurately to 0.1 pound. Moisture in aggregates was determined and compensatory amounts of respective aggregate, equal in weight to the relative moisture content, were added to the batch proportions.

Of course, the above description of the mixing steps is by way of preferred example only, thus, one may proceed by (a) mixing fibre with water and adding to the remaining ingredients (b) mixing fibre, water and air-entraining agent and adding to the remaining ingredient or (c) mixing fibre with dry ingredients and adding water and air-entraining agent.

Experiments to determine the extent of air entrainment resulting from mixing air entraining agent in various proportions first in standard concrete and mortar formulations for a standard span of time and then in the same formulations to which fibre had been added during mixing, show that substantial increases in air entrainment occur in the latter cases. This is illustrated by the curves in the figure of the accompanying drawings, in which curve A represents the average of results obtained using air entraining agent alone, and curve B represents the average of results obtained using said agent and fibre. The batch proportions in every case were as follows:

OP cement ........................................lb..  1.0
Natural sand (zone 3, chert/flint) ..............lb..  1.0
Water added .....................................lb..  0.4
Mixed in Hobart mixer using broad beater (mixing time)—
 (Speed No. 1) ...............................min..  1
 (Speed No. 2) ...............................min..  1

It is satisfactory to take the fibres as packed, weigh, and charge into the wet mix without preliminary treatment.

The following examples illustrate the present invention.

In the examples, shown in tabular form, the product (row 1) is either a conventional concrete (C) with maximum aggregate size given in inches e.g. "C1½," a lightweight concrete (LC) or a mortar (M). The aggregate (2) is chert/flint (C/F), limestone (L), basalt (B), granite (G), "Lytag" (LY), sand (S), "Leca" (LE), foamed slag (FS), pulverised fuel ash (PFA), furnace bottom ash (FBA), or crushed stone (CS). The cement (3) is as described above. The "proportions" (4) and water (5) are measured in parts per part of cement, and SS is "single size," CG "all-in continuous grading," GR "graded," TD "to dust," M "medium grade," F "fines," dimensions being in inches. The amounts of fibre (6) and air entraining agent (8) are self-explanatory. The nature of the fibre (7) is:

| Abbreviation | Name | Specific gravity | Diameter (inches) | Length (inches) |
|---|---|---|---|---|
| PP (i) | Polypropylene | .905 | .005 | .625 |
| PP (ii) | do | .905 | .005 | .125 |
| R | Rayon | 1.5 | .001 | .25 |
| F | Flax | | | .75 |
| PE | Polyethylene | .93 | .012 | .75 |
| N6 (i) | Nylon-6 | 1.13 | .01 | 1.0 |
| N6 (ii) | do | 1.13 | .006 | .5 |
| C | Cotton | | | .75 |
| PVC (i) | Polyvinylchloride | 1.05 | .02 | 1.0 |
| PVC (ii) | do | 1.05 | .008 | .5 |
| PVC (iii) | do | 1.05 | .008 | .125 |
| PVC (iv) | do | 1.05 | .005 | .375 |
| O | Orlon | 1.2 | .001 | .25 |
| PS | Polystyrene | 1.06 | .006 | 1.125 |
| G (i) | Glass | 2.6 | .001 | 1.0 |
| G (ii) | do | 2.6 | | 1.125 |

The "speeds" (9) are denoted as LC, which indicates a "Linear Cumflow" type of mixer was used at .5 minute to wet the mix and incorporate fibre and 3.5 minutes to aerate the mix; and as H, where a Hobart mixer was used, in each case for 1 minute dry-to-wet and for the number of minutes individually shown to aerate the mix. The densities (10), (11), (12) where FWD is "fresh wet density" are given in lbs./ft.$^3$. (13)=(12)−(10) divided by (12), and expressed as a percentage. (14)=(12)−(11) divided by (12) and expressed as a percentage. The remaining results (15) to (19) are self-explanatory.

| | Row | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Product | 1 | C1½ 7:1 | C1½ 7:1 | C1½ 4:1 | C1½ 3:1 | C1½ 3:1 | C1½ 3:1 | C1½ 3:1 | C¾ 7:1 |
| Aggregate | 2 | C/F | C/F | C/F | C/F | C/F | C/F | L | C/F |
| Cement | 3 | RH 1 | SRH 1 | HA 1 | SRH 1 | RH 1 | OP 1 | RH 1 | HA 1 |
| Proportions | 4 | S 2.4 | S 2.4 | 1½CG 4.00 | S 1.50 | 1½CG 3.0 | S 1.5 | 1½CG 3.0 | S 2.50 |
| Do | 4 | ³⁄₁₆SS 0.92 | 1½-³⁄₁₆GR 4.60 | | 1½-³⁄₁₆ 1.50 | | 1½-³⁄₁₆ R 1.5 | | ¾-³⁄₁₆GR 4.50 |
| Do | 4 | ¾SS 1.38 | | | | | | | |
| Do | 4 | 1¼SS 2.30 | | | | | | | |
| Water | 5 | 0.57 | .57 | 0.4 | 0.4 | 0.4 | 0.4 | 0.4 | 0.6 |
| Fibre (gm./lb. cement) | 6 | 2 | 2 | 2 | 10 | 2 | 10 | 5 | 4 |
| Fibre | 7 | PP(i) | PP(i) | R | PP(i) | PP(i) | PP(ii) | PP(i) | F |
| Air entraining agent (cc.'s/lb. cement) | 8 | 6 | 6 | 6 | 6 | 6 | 6 | 6 | 6 |
| Speeds | 9 | LC | H 1 | LC | H 1 | LC | LC | LC | H 1 |
| Fresh wet density | 10 | 125 | 130 | 122 | 130 | 125 | 115 | 108 | 120 |
| Oven dry density | 11 | 118 | 123 | 116 | 123 | 117 | 110 | 100 | 112 |
| Control fwd | 12 | 148 | 148 | 148 | 150 | 150 | 148 | 150 | 149 |
| Percent air entrainment | 13 | 16 | 12 | 18 | 13 | 17 | 22 | 28 | 19 |
| Percent total air entrainment | 14 | 20 | 17 | 22 | 18 | 22 | 26 | 33 | 25 |
| Compressive strength in p.s.i.: | | | | | | | | | |
| 3 days | 15 | 980 | 1,900 | 1,600 | 5,000 | 1,560 | 1,400 | 1,000 | 600 |
| 7 days | 16 | 1,230 | 2,080 | 1,760 | 5,400 | 1,960 | 1,800 | 1,120 | 720 |
| 28 days | 17 | 1,400 | 2,300 | 1,900 | 5,530 | 2,900 | 2,300 | 1,440 | 880 |
| Drying shrinkage, percent | 18 | .015 | .020 | .025 | .035 | .050 | .035 | .045 | .065 |
| Wetting expansion, percent | 19 | .010 | .025 | .020 | .030 | .050 | .030 | .040 | .060 |

| | Row | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| Product | 1 | C¾ 7:1 | C¾ 7:1 | C¾ 5.6:1 | C¾ 5.6:1 | C¾ 4:1 | C¾ 4:1 | C¾ 2:1 | C¾ 2:1 | C½ 4.5:1 | C½ 4:1 |
| Aggregate | 2 | C/F | C/F | C/F | C/F | L | C/F | C/F | C/F | C/F | B |
| Cement | 3 | SRH1 | OP1 | SRH1 | RH1 | RH1 | RH1 | RH1 | RH1 | HA1 | OP1 |
| Proportions | 4 | S 2.52 | S 2.52 | S 2.01 | S 2.01 | ½TD 2.0 | S 2.0 | S 1.0 | ⅛"TD 2.0 | ⅛"SS 1 | ⅛"TD 2 |
| Do | 4 | ⅜SS 1.12 | ⅜SS 1.12 | ⅜SS .90 | ⅜SS 0.90 | ¼SS 0.8 | ⅜SS 0.8 | ⅜SS .50 | ⅜SS .50 | ¼SS 1 | ½SS 2 |
| Do | 4 | ¾SS 3.36 | ¾SS 3.36 | ¾SS 2.69 | ¾SS 2.69 | ¾SS 1.2 | ¾SS 1.2 | ¾SS .50 | ¾SS .50 | ½"SS .15 | |
| Do | 4 | | | | | | | | | | |
| Water | 5 | 0.64 | .64 | .55 | .55 | 0.4 | .4 | .33 | .35 | 0.4 | 0.4 |
| Fibre (gm./lb. cement) | 6 | 2 | 2 | 2 | 2 | 6 | 5 | 2 | 2 | 5 | 4 |
| Fibre | 7 | PP(i) | PP(i) | PP(i) | PP(i) | PP(i) | PP(i) | PE | N6(i) | C | PP(i) |
| Air entraining agent (cc.'s/lb. cement) | 8 | 6 | 6 | 6 | 6 | 6 | 6 | 6 | 6 | 6 | 6 |
| Speeds | 9 | H1 | H1 | H1 | H1 | H3 | H1 | H1 | H2 | H1 | H2 |
| Fresh wet density | 10 | 117 | 111 | 113 | 111 | 96 | 122 | 118 | 118 | 120 | 107 |
| Oven dry density | 11 | 110 | 104 | 107 | 106 | 89 | 116 | 112 | 110 | 114 | 100 |
| Control fwd | 12 | 149 | 149 | 149 | 150 | 148 | 148 | 149 | 149 | 149 | 149 |
| Percent air entrainment | 13 | 21 | 26 | 24 | 26 | 36 | 18 | 21 | 21 | 19 | 28 |
| Percent total air entrainment | 14 | 26 | 30 | 28 | 29 | 41 | 22 | 25 | 26 | 23 | 33 |
| Compressive strength in p.s.i.: | | | | | | | | | | | |
| 3 days | 15 | 700 | 250 | 1,270 | 630 | 300 | 1,160 | 1,280 | 1,400 | 1,250 | 325 |
| 7 days | 16 | 760 | 340 | 1,330 | 770 | 460 | 2,060 | 3,150 | 2,800 | 1,300 | 545 |
| 28 days | 17 | 920 | 600 | 1,550 | 820 | 760 | 2,360 | 4,000 | 4,150 | 1,400 | 900 |
| Drying shrinkage, percent | 18 | .030 | .025 | .030 | .020 | .045 | .035 | .060 | .060 | .045 | .045 |
| Wetting expansion, percent | 19 | .025 | .015 | .025 | .015 | .030 | .030 | .060 | .050 | .040 | .035 |

| | Row | Ex. 19 | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|
| Product | 1 | C½ 3:1 | C½ 2:1 | C⅜ 4:1 | LC½ 3:1 | LC½ 4:1 | LC½ 4:1 | LC½ 3:1 | LC½ 3:1 | LC½ 2.4:1 | LC½ 2:1 |
| Aggregate | 2 | B | G | C/F | C/F | LY | LY | LY/S | LY | LY | LY |
| Cement | 3 | RH 1.00 | RM 1.0 | RH 1 | W 1.0 | RH 1 | HA 1 | RH 1 | RH 1 | RH 1 | OP 1 |
| Proportions | 4 | ⅛″TD .20 | ⅛″TD 1.0 | S 2 | S 2 | F 2 | F 2 | F 1 | F 1.5 | F 1.2 | F 1 |
| Do | 4 | ½″SS 1.80 | ¼″SS 0.5 | ⅜″SS 2 | ⅜ SS 1 | M 2 | M 2 | M 1 | M 1.5 | M 1.2 | M 1 |
| Do | 4 | | ½″SS 0.5 | | | | | S 1 | | | |
| Do | 4 | | | | | | | | | | |
| Water | 5 | 0.45 | 0.4 | 0.4 | 0.4 | 0.4 | 0.45 | 0.3 | 0.4 | 0.2 | 0.4 |
| Fibre (gm./lb. cement) | 6 | 1 | 2 | 2 | 2 | 2 | 1 | 5 | 5 | 5 | 2 |
| Fibre | 7 | PVC(i) | N6(ii) | PP(i) | PVC(i) | PP(i) | O | PS | PVC(i) | PP(i) | N6(ii) |
| Air entraining agent (cc.'s/lb. cement) | 8 | 6 | 6 | 6 | 6 | 6 | 6 | 6 | 6 | 2 | 6 |
| Speeds | 9 | H 2 | H 1 | H 1 | H 1 | H 1 | H 1 | H 1.5 | H 1 | H 1 | H 3 |
| Fresh wet density | 10 | 107 | 125 | 156 | 112 | 97 | 92 | 96 | 90 | 87 | 78 |
| Oven dry density | 11 | 98 | 118 | 115 | 100 | 85 | 83 | 85 | 77 | 74 | 66 |
| Control fwd | 12 | 149 | 150 | 148 | 148 | 112 | 113 | 128 | 114 | 114 | 113 |
| Percent air entrainment | 13 | 28 | 17 | 15 | 24 | 13 | 18 | 24 | 21 | 24 | 31 |
| Percent total air entrainment | 14 | 35 | 21 | 22 | 32 | 24 | 26 | 34 | 32 | 35 | 42 |
| Compressive strength in p.s.i.: | | | | | | | | | | | |
| 3 days | 15 | 1,000 | 1,600 | 1,880 | 1,000 | 1,470 | 1,800 | 1,350 | 1,070 | 910 | 600 |
| 7 days | 16 | 1,300 | 4,560 | 2,350 | 1,540 | 2,200 | 2,000 | 1,760 | 1,370 | 1,260 | 720 |
| 28 days | 17 | 1,750 | 6,480 | 2,830 | 2,050 | 3,350 | 2,150 | 2,500 | 1,760 | 1,700 | 1,000 |
| Drying shrinkage, percent | 18 | .06 | 0.7 | .05 | .05 | .05 | .055 | .075 | .065 | .080 | .060 |
| Wetting expansion, percent | 19 | .055 | .06 | .05 | .045 | .05 | .05 | .055 | .055 | .060 | .050 |

| | Row | Ex. 29 | Ex. 30 | Ex. 31 | Ex. 32 | Ex. 33 | Ex. 34 | Ex. 35 | Ex. 36 | Ex. 37 |
|---|---|---|---|---|---|---|---|---|---|---|
| Product | 1 | LC½ 4:1 | LC½ 3:1 | LC½ 2.4:1 | LC½ 2:1 | LC½ 4:1 | LC½ 4:1 | LC½ 3:1 | LC½ 2:1 | M 5:1 |
| Aggregate | 2 | LE | LE/LY | LE | LE | OP 1 | PFA/FS | S/FS | FS/S | S |
| Cement | 3 | OP 1 | RH 1 | RH 1 | RH 1 | OP 1 | RH 1 | RH 1 | RH 1 | HA 1 |
| Proportions | 4 | F 2 | F/Le 2 | F 1.2 | F 1 | FS½–⅛″ G 2 | FBA½″CG 2 | FBA½–⅛″ TD 0.5 | S 5 |
| Do | 4 | M 2 | M(le) 1 | M 1.2 | M 1 | S 2 | PFA(F) 2 | S 1 | S 0.5 | |
| Do | 4 | | F(Ly) 1 | | | | | | FS½–⅛″ G 1.0 | |
| Do | 4 | | | | | | | | | |
| Water | 5 | 0.4 | 0.25 | 0.2 | 0.3 | 0.4 | 0.75 | 0.5 | 0.35 | 0.5 |
| Fibre (gm./lb. cement) | 6 | 1 | 2 | 1 | 1 | 1 | 2 | 2 | 2 | 1 |
| Fibre | 7 | PP(i) | PP(i) | PP(i) | PVC(ii) | PVC(iii) | PVC(i) | PP(i) | PP(i) | G(i) |
| Air entraining agent (cc. s/lb. cement) | 8 | 6 | 6 | 1 | 6 | 6 | 6 | 3 | 6 | 1 |
| Speeds | 9 | H 1 | H 1 | H 1 | H 2 | H 1 | H 1 | H 1 | H 1 | H 1 |
| Fresh wet density | 10 | 50 | 62 | 66 | 48 | 82 | 88 | 72 | 88 | 114 |
| Oven dry density | 11 | 43 | 50 | 56 | 36 | 74 | 76 | 60 | 76 | 104 |
| Control fwd | 12 | 80 | 86 | 80 | 78 | 125 | 110 | 98 | 135 | 146 |
| Percent air entrainment | 13 | 38 | 28 | 18 | 38 | 34 | 20 | 27 | 35 | 22 |
| Percent total air entrainment | 14 | 46 | 42 | 30 | 54 | 41 | 31 | 39 | 44 | 29 |
| Compressive strength in p.s.i.: | | | | | | | | | | |
| 3 days | 15 | 80 | 280 | 810 | 300 | 90 | 380 | 280 | 450 | 600 |
| 7 days | 16 | 110 | 350 | 960 | 410 | 125 | 470 | 350 | 700 | 720 |
| 28 days | 17 | 150 | 550 | 1,300 | 590 | 150 | 620 | 520 | 1,000 | 800 |
| Drying shrinkage, percent | 18 | .05 | .07 | .07 | .075 | .045 | .065 | .065 | .050 | .035 |
| Wetting expansion, percent | 19 | .045 | .055 | .06 | .07 | .035 | .060 | .045 | .040 | .030 |

| | Row | Ex. 38 | Ex. 39 | Ex. 40 | Ex. 41 | Ex. 42 | Ex. 43 | Ex. 44 |
|---|---|---|---|---|---|---|---|---|
| Product | 1 | M 4:1 | M 4:1 | M 2:1 | M 2:1 | M 2:1 | M 2:1 | C¾ 4:1 |
| Aggregate | 2 | L | S | S | S | S | B | C/F |
| Cement | 3 | RH 1 | OP 1 | W 1 | W 1 | W 1 | W 1.0 | OP 1 |
| Proportions | 4 | ⅛″ TD 4 | S 4 | S 2 | S 2 | S 2 | ⅛″ TD 2 | S 1.11 |
| Do | 4 | | | | | | | ⅜″ SS .64 |
| Do | 4 | | | | | | | ¾″ SS 2.13 |
| Do | 4 | | | | | | | |
| Water | 5 | 0.3 | 0.4 | 0.33 | .33 | .42 | .4 | .41 |
| Fibre (gm./lb. cement) | 6 | 1 | 2 | 10 | 10 | 1 | 1 | 1 |
| Fibre | 7 | PP(i) | PP(i) | G(i) | G(i) | PVC(i) | PP(i) | PP(i) |
| Air entraining agent (cc. s/lb. cement) | 8 | 6 | 6 | 6 | 6 | 6 | 6 | 6 |
| Speeds | 9 | H 2 | H 3 | H 5 | H 2 | H 2 | H 2 | H 5 |
| Fresh wet density | 10 | 112 | 92 | 112 | 105 | 88 | 95 | 127 |
| Oven dry density | 11 | 107 | 83 | 108 | 99 | 82 | 85 | 117 |
| Control fwd | 12 | 149 | 147 | 136 | 136 | 136 | 148 | 150 |
| Percent air entrainment | 13 | 25 | 37 | 17 | 23 | 35 | 36 | 15.3 |
| Percent total air entrainment | 14 | 28 | 44 | 20 | 27 | 40 | 42 | 22 |
| Compressive strength in p.s.i.: | | | | | | | | |
| 3 days | 15 | 930 | 420 | 2,940 | 1,530 | 500 | 1,000 | |
| 7 days | 16 | 1,450 | 560 | 3,300 | 2,040 | 710 | 1,290 | 3,000 |
| 28 days | 17 | 2,150 | 715 | 5,000 | 3,000 | 980 | 1,990 | |
| Drying shrinkage, percent | 18 | .050 | .065 | .040 | .04 | .03 | .035 | |
| Wetting expansion, percent | 19 | .045 | .060 | .040 | 0.35 | .03 | .03 | |

3,679,445

| | Row | Ex. 45 | Ex. 46 | Ex. 47 | Ex. 48 | Ex. 49 | Ex. 50 | Ex. 51 |
|---|---|---|---|---|---|---|---|---|
| Product | 1 | M 2:1 | M 2:1 | M 2:1 | C¼ 3:1 | M 2:1 | M 3:1 | LC½ 2:1 |
| Aggregate | 2 | S/CS | S | S | CS | FS/F | FS/F | LY |
| Cement | 3 | W 1 | W 1 | W 1 | RH 1 | OP 1 | OP 1 | OP 1 |
| Proportions | 4 | ⅛"TD 2 | S 2 | S 2 | ⅛"TD 1.2 | F 1 | F 2 | F 1 |
| Do | 4 | | | | ½"-¼" 1.8 | S 1 | S 1 | M 1 |
| Do | | | | | | | | |
| Do | | | | | | | | |
| Water | 5 | .4 | .42 | .42 | .45 | .33 | .33 | .4 |
| Fibre (gm./lb. cement) | 6 | 1 | 10 | 1 | 1 | 10 | 10 | 2 |
| Fibre | 7 | PP(i) | PP(i) | PVC(iv) | PP(i) | G(i) | G(ii) | PP(i) |
| Air entraining agent (cc.'s/lb. cement) | 8 | 6 | 6 | 6 | 6 | 6 | 6 | 6 |
| Speeds | 9 | H 1 | H 1 | H 1 | H 1 | | | H1 |
| Fresh wet density | 10 | 95 | 88 | 91 | 107 | 96 | 83.7 | 78 |
| Oven dry density | 11 | 85 | 82.4 | 86.4 | 98 | 88 | 76.7 | 66 |
| Control fwd | 12 | 148 | 136 | 136 | 149 | 135 | 123 | 113 |
| Percent air entrainment | 13 | 36 | 35 | 33 | 28 | 33 | 32 | 31 |
| Percent total air entrainment | 14 | 42 | 39.1 | 40.5 | 35 | 34.7 | 38.5 | 42 |
| Compressive strength in p.s.i.: | | | | | | | | |
| 3 days | 15 | 1,000 | 500 | 855 | 1,000 | 1,200 | 310 | 600 |
| 7 days | | | | | | | | |
| 28 days | | | | | | | | |
| Drying shrinkage, percent | | | | | | | | |
| Wetting expansion, percent | | | | | | | | |

It will be appreciated that the invention also includes a hardened mortar or concrete formed by the hardening of a wet or plastic mortar or concrete mix according to the invention. The hardened mortar or concrete may be shaped as a part of a structure, such as a wall or floor. The hardened mortar or concrete may also be formed as a precast building component such as a lintel.

Furthermore, the invention also includes a method of making a part of a structure, which method involves pouring a wet or plastic mix according to the invention into a form or mould.

I claim:

1. A wet plastic air entrained concrete mix having dimensional stability and consisting essentially of
   a cement selected from the group consisting of portland cement and high alumina cement;
   a fine aggregate and a coarse aggregate in a ratio of from 100% to 1000% by weight of said cement, said coarse aggregate being of a maximum size up to 1½ inches;
   short fibers in a ratio of from 0.22% to 2.2% by weight of said cement, said fibers having a length of up to two inches;
   an air entraining agent; and
   water in an amount less than 100% by weight of said cement to facilitate mixing of said cement, aggregate, fibers and air entraining agent into said wet plastic mix prior to placing, setting and hardening of said mix into an air-entrained concrete containing a volume of air within non-communicating air entrained cells in the structure with said fibers assuring uniform distribution of the air in the structure.

2. A wet plastic mix as claimed in claim 1, wherein the maximum ratio of said aggregate to said cement by weight is 7:1.

3. A wet plastic mix as claimed in claim 1 including a natural coarse aggregate.

4. A wet plastic mix as claimed in claim 1 including a synthetic coarse aggregate.

5. A wet plastic mix as claimed in claim 4, wherein said fine aggregate and said coarse aggregate are each selected from the group consisting of sintered pulverized fuel ash; a foamed slag aggregate; a bloated clay aggregate; and a furnace bottom ash.

6. A wet plastic mix as claimed in claim 1 containing at least 0.2 pound of water per pound of cement.

7. A wet plastic mix as claimed in claim 1, wherein the short fibers are from ⅛ to 1⅛ inches long.

8. A wet plastic mix as claimed in claim 1 wherein the fibre diameter is up to 0.02 inch.

9. A wet plastic mix as claimed in claim 1 wherein the fibres are glass fibres.

10. A wet plastic mix as claimed in claim 1 wherein the amount of air entraining agent present per pound of cement is adequate to entrain a substantial volume of air without unacceptable lengthening of the setting and hardening time beyond that of non-air-entrained concrete.

11. A wet plastic mix as claimed in claim 10 wherein the volume of entrained air is in excess of 10% by volume.

12. A wet plastic mix as claimed in claim 1 wherein the fibers are synthetic polymeric fibers selected from the group consisting of polypropylene, rayon, nylon-6, polyvinylchloride, Orlon or polystyrene.

13. A wet plastic mix as claimed in claim 1 wherein the fibers are naturally occurring cellulosic fibers.

14. A wet plastic mix as set forth in claim 1 wherein said structure is an air-entrained light weight concrete and said mix has an oven dry density between 36 and 85 pounds per cubic foot.

15. A wet plastic mix as set forth in claim 1 wherein said structure is an air-entrained concrete and said mix has an oven dry density between 89 and 123 pounds per cubic foot.

16. A wet plastic air entrained mortar mix having dimensional stability and consisting essentially of
   cement selected from the group consisting of portland cement and high alumina cement;
   a fine mortar aggregate in a ratio of from 1 to 10 by weight of said cement;
   short fibers in a ratio of from 0.22% to 2.2% by weight of said cement and of a length of up to two inches;
   an air-entraining agent; and
   water in a ratio of less than 1 by weight of said cement to facilitate mixing of said cement, aggregate, air-entrainment agent and fibers into said wet plastic mix prior to placing, setting and hardening of said mix into a mortar structure; said mortar having a substantially uniform distribution of said cement, aggregate, air and fibers therethrough.

17. A wet plastic mix as set forth in claim 16 wherein said structure is an air entrained mortar and said mix has an oven dry density between 76.7 and 108 pounds per cubic foot.

18. A wet plastic mix as claimed in claim 16 wherein the maximum ratio of aggregate to cement by weight is 7:1.

19. A wet plastic mix as claimed in claim 16 containing at least 0.2 pound of water per pound of cement.

20. A wet plastic mix as claimed in claim 16 wherein the amount of air entraining agent present per pound of cement is adequate to entrain a substantial volume of air without unacceptable lengthening of the setting and hardening time beyond that of non-air entrained mortar.

21. A wet plastic mix as claimed in claim 14 wherein the volume of entrained air is in excess of 10% by volume.

22. A wet plastic mix as claimed in claim 16 wherein thhe short fibers are from ⅛ to 1⅛ inches long.

23. A hardened concrete consisting essentially of a hardened and set wet dimensionally stable plastic mix of a cement selected from the group consisting of portland cement and high alumina cement; a fine aggregate and a coarse aggregate in a ratio of from 1 to 10 by weight of said cement said coarse aggregate being of a particle size up to 1½ inches; short fibers in a ratio of from 0.22% to 2.2% by weight of said cement and of a length of up to two inches; an air-entraining agent; and water in an amount to facilitate mixing of said cement, aggregate, air entrainment agent and fibers into said mix and placing, setting and hardening of said mix into said concrete; said concrete having a substantially uniform distribution of said cement, aggregate, air and fibers therethrough and an oven dry density of at least 78 pounds per cubic foot.

24. A hardened concrete as set forth in claim 23 having an air entrained content in excess of 10% by volume of said concrete.

25. A hardened concrete as set forth in claim 23 having a precast building component shape.

26. A hardened concrete as set forth in claim 23 having a density of from 89 to 123 pounds per cubic foot and a 28-day compressive strength in excess of 3,000 pounds per square inch.

References Cited

UNITED STATES PATENTS

| | | | |
|---|---|---|---|
| 3,141,857 | 7/1964 | Sommer | 106—88 |
| 3,062,670 | 11/1962 | Marzocci et al. | 106—99 |
| 3,062,669 | 11/1962 | Dilnot | 106—99 |
| 3,044,547 | 7/1962 | Jarboe | 106—99 |
| 2,598,981 | 6/1962 | Denning | 106—88 |

FOREIGN PATENTS

Tea and Desch: "The Chemistry of Cement and Concrete," Edw. Arnold & Sons Ltd., pp. 483–485, 506–507, 510 (1956).

Goldfein, S.: "Fibrous Reinforcement for Portland Cement," Modern Plastics, pp. 156, 158, 160 (April 1965).

TOBIAS E. LEVOW, Primary Examiner

W. T. SCOTT, Assistant Examiner

U.S. Cl. X.R.

106—90, 93, 99

UNITED STATES PATENT OFFICE
CERTIFICATE OF CORRECTION

Patent No. 3,679,445  Dated July 25, 1972

Inventor(s) Alan Colin Scott Howe

It is certified that error appears in the above-identified patent and that said Letters Patent are hereby corrected as shown below:

Column 1, line 9, "August 23, 1969" should be
—August 23, 1968—.

<u>In the Chart</u>

Example 1, Row 4 (second row 4) "3/16SS" should be
—3/8 SS"

Example 4, Row 4 (second row 4) "3/16" should be
—3/16 GR—

Examples 12 and 13, Row 12, "150   148" should be
—149   150—.

Example 22, Row 1, "LC 1/2" should be —C 3/8—
3:1                                        3:1

Example 19, Row 4, "TD   " should be — TD  —
.20                          1.20

Example 22, Row 4 (second row 4) "3/8 SS 1" should be
—3/8'' SS 1—.

Examples 22 and 23, Row 6, "2   2" should be —1   5—.

Example 21, Row 10, "156" should be —126—.

Example 21, Row 19, ".05" should be —.04—.

Signed and sealed this 6th day of March 1973.

(SEAL)
Attest:

EDWARD M. FLETCHER, JR.          ROBERT GOTTSCHALK
Attesting Officer                Commissioner of Patents